(12) United States Patent
Bates et al.

(10) Patent No.: US 9,059,658 B2
(45) Date of Patent: Jun. 16, 2015

(54) INCREASING TAPE VELOCITY BY DYNAMIC SWITCHING

(75) Inventors: Allen Keith Bates, Tucson, AZ (US); Nhan Xuan Bui, Tucson, AZ (US); Reed Alan Hancock, Tucson, AZ (US); Wayne Isami Imaino, San Jose, CA (US); Daniel James Winarski, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 836 days.

(21) Appl. No.: 12/202,854

(22) Filed: Sep. 2, 2008

(65) Prior Publication Data

US 2010/0052584 A1 Mar. 4, 2010

(51) Int. Cl.
*H02P 25/18* (2006.01)
*H02P 27/08* (2006.01)

(52) U.S. Cl.
CPC ............... *H02P 25/18* (2013.01); *H02P 27/08* (2013.01)

(58) Field of Classification Search
USPC ......... 318/491, 538, 543, 544, 545, 768, 771, 318/772, 494–499
See application file for complete search history.

(56) References Cited

U.S. PATENT DOCUMENTS

| | | | |
|---|---|---|---|
| 1,467,745 A * | 9/1923 | Zederbohm | 318/771 |
| 3,571,801 A * | 3/1971 | Coolidge et al. | 360/51 |
| 3,876,168 A | 4/1975 | Powers, Jr. | |
| 3,876,923 A | 4/1975 | Humphrey et al. | |
| 3,916,257 A * | 10/1975 | Harper, Jr. | 361/32 |
| 4,059,245 A * | 11/1977 | Hirose | 242/356.5 |
| 4,167,692 A * | 9/1979 | Sekiya et al. | 318/400.41 |
| 4,357,542 A | 11/1982 | Kirschbaum | |
| 4,425,539 A | 1/1984 | Wills | |
| 4,477,760 A * | 10/1984 | Kuznetsov | 318/773 |
| 4,513,229 A | 4/1985 | Kudelski | |
| 4,642,536 A | 2/1987 | Boyd, Jr. et al. | |
| 4,675,591 A * | 6/1987 | Pleiss | 318/773 |
| 4,691,155 A * | 9/1987 | Taylor et al. | 318/771 |
| 4,736,147 A * | 4/1988 | Shizhang | 318/778 |
| 4,801,853 A | 1/1989 | Lewis et al. | |
| 4,890,049 A * | 12/1989 | Auinger | 318/771 |
| 5,068,587 A * | 11/1991 | Nakamura et al. | 318/771 |
| 5,124,860 A * | 6/1992 | Czonka | 360/71 |
| 5,216,343 A | 6/1993 | Genheimer et al. | |
| 5,352,964 A | 10/1994 | Nakamura et al. | |
| 5,406,190 A | 4/1995 | Rosenberg | |
| 5,418,436 A | 5/1995 | Apuzzo | |
| 5,442,250 A * | 8/1995 | Stridsberg | 310/186 |

(Continued)

FOREIGN PATENT DOCUMENTS

| | | |
|---|---|---|
| EP | 0814473 A2 | 12/1997 |
| EP | 0873587 B1 | 10/1998 |

(Continued)

*Primary Examiner* — Bentsu Ro
(74) *Attorney, Agent, or Firm* — Griffiths & Seaton PLLC (57) ABSTRACT

An apparatus for controlling an electric motor is provided. A plurality of switches is provided for controlling a direction of current through motor coils of the electric motor. A brushless motor control circuit is connected to each of the plurality of switches. Responsive to a request to adjust one of an angular velocity and an angular acceleration of the electric motor, the plurality of switches are activated to place the motor coils in a predetermined configuration to maximize torque or reduce a total back electromotive force (BEMF) from the motor coils.

15 Claims, 6 Drawing Sheets

(56) References Cited

U.S. PATENT DOCUMENTS

| | | |
|---|---|---|
| 5,614,799 A | 3/1997 | Anderson et al. |
| 5,687,075 A | 11/1997 | Stothers |
| 5,818,195 A | 10/1998 | Frick et al. |
| 5,821,660 A | 10/1998 | Anderson |
| 5,912,522 A | 6/1999 | Rivera |
| 5,982,123 A | 11/1999 | Hornung et al. |
| 6,215,261 B1 | 4/2001 | Becerra |
| 6,400,039 B1 | 6/2002 | Wobben |
| 6,727,668 B1 | 4/2004 | Maslov et al. |
| 7,091,691 B2 | 8/2006 | Min et al. |
| 7,102,307 B2 | 9/2006 | Shao |
| 7,141,949 B2 | 11/2006 | Harwood |
| 7,400,071 B2 | 7/2008 | Adra |
| 7,977,842 B2 | 7/2011 | Lin |
| 8,704,474 B2 | 4/2014 | Li et al. |
| 2006/0273686 A1 | 12/2006 | Edelson et al. |

FOREIGN PATENT DOCUMENTS

| | | |
|---|---|---|
| TW | 081103623 B | 1/1993 |
| WO | 9725767 A1 | 7/1997 |

* cited by examiner

INCREASING TAPE VELOCITY BY DYNAMIC SWITCHING

BACKGROUND OF THE INVENTION

1. Field of the Invention

The present invention generally relates to field of data tape transport devices. The present invention specifically relates to back electromotive force ("BEMF") voltage reduction in a storage drive (e.g., a tape drive).

2. Description of the Related Art

Magnetic tape provides a means for physically storing data. As an archival medium, tape often comprises the only copy of the data. A tape drive is used to store and retrieve data with respect to the magnetic tape. An example of a tape drive is the IBM TotalStorage Enterprise Tape Drive 3592 manufactured by IBM Corporation. Tape drives are typically used in combination with an automated data storage library. For example, the IBM TotalStorage Enterprise Tape Library 3494 manufactured by IBM Corporation is an automated data storage library that may include one or more tape drives and data storage media for storing data with respect to the tape drives.

Tape drives frequently employ DC motors and feedback control systems with motor drivers for operating the DC motors, to produce well-controlled motion parameters such as position, velocity, and tape tension. While the motors rotate, a back electromotive force ("BEMF") is produced by the tape drive electric motors. This BEMF voltage is produced because the electric motors generate an opposing voltage while rotating.

In tape drives such as the aforementioned IBM 3592 used in the Enterprise range, and the Linear Tape Open used in the mid-range, the current tape linear velocity is limited by the tape reel's angular velocity. The tape reel's angular velocity approaches a maximum when the BEMF produced by the reel motor approaches the voltage of the power supply to the reel motors. Tape drives typically operate from +5 and +12 V power supplies; therefore it is not possible to increase the power supply voltage to increase the tape reel angular velocity. In light of the foregoing, a need exists for a mechanism by which tape reel angular velocity may be increased in tape transport systems incorporating fixed power supplies.

SUMMARY OF THE INVENTION

While it is not possible to increase power supply voltage to increase tape reel angular velocity in tape transport systems implementing a fixed power supply, it is possible to decrease the BEMF and increase the tape reel angular velocity by reducing the torque constant and voltage constant of the reel motor. Reducing the torque constant of the reel motor decreases the tape reel angular acceleration, impacting performance. The present invention discloses apparatus and method embodiments of mechanisms to selectively either reduce the BEMF from the reel motor, therefore increasing the allowable tape reel angular velocity for a fixed power supply voltage, or maintain a higher tape reel angular acceleration. By use of the following mechanism, either the tape linear velocity or tape linear acceleration may be selectively increased relative to present implementations.

Accordingly, in one embodiment, by way of example only, an apparatus for controlling an electric motor is provided. A plurality of switches is provided for controlling a direction of current through motor coils of the electric motor. A brushless motor control circuit is connected to each of the plurality of switches. Responsive to a request to adjust one of an angular velocity and an angular acceleration of the electric motor, the plurality of switches are activated to place the motor coils in a predetermined configuration to maximize torque or reduce a total back electromotive force (BEMF) from the motor coils.

In an additional embodiment, again by way of example only, a method for controlling an electric motor is provided. A request is received to adjust one of an angular velocity and an angular acceleration of the electric motor. A plurality of switches is activated for controlling a direction of current through motor coils of the electric motor. The plurality of switches are activated to place the motor coils in a predetermined configuration to maximize torque or reduce a total back electromotive force (BEMF) from the motor coils.

In still another embodiment, again by way of example only, a method for controlling the rate of movement of tape media in a tape storage drive having a fixed power supply voltage is provided. The tape storage drive includes at least one tape reel driven by an electric motor having a plurality of motor coils. A request is received to adjust one of an angular velocity and an angular acceleration of the tape reel. A plurality of switches is activated for controlling a direction of current through the motor coils. The plurality of switches are activated to place the motor coils in a predetermined configuration to maximize torque or reduce a total back electromotive force (BEMF) from the motor coils.

In still another embodiment, again by way of example only, a method of manufacturing an apparatus for controlling an electric motor is provided. A plurality of switches is provided for controlling a direction of current through motor coils of the electric motor. A brushless motor control circuit is connected to each of the plurality of switches. Responsive to a request to adjust one of an angular velocity and an angular acceleration of the electric motor, the plurality of switches are activated to place the motor coils in a predetermined configuration to maximize torque or reduce a total back electromotive force (BEMF) from the motor coils.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for increasing maximum tape reel angular velocity by use of a motor control switching circuit. The motor control switching circuit reduces the total Back EMF (BEMF) produced by the reel motor by bypassing a portion of the motor coils when high angular velocity is needed. Although bypassing a portion of the motor coils reduces the rotational acceleration capability of the motor because the torque constant of the motor is reduced in the effort to reduce the voltage constant of the motor, the motor control switching circuit is able to produce the necessary acceleration when needed by switching in the previously bypassed motor coils.

Figure 1:
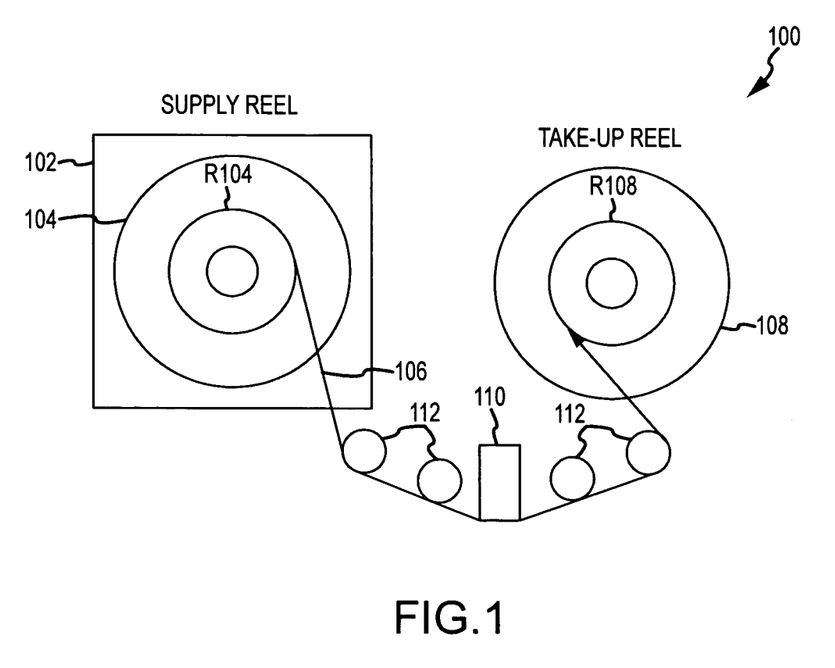
FIG. 1 is a diagram illustrating the tape path in a tape transport system.

FIG. 1 is a diagram illustrating the tape path of an exemplary tape transport system 100. The tape transport system 100 illustrated in FIG. 1 accepts a tape cartridge 102 containing first tape reel 104 on which is wound a length of tape 106. The tape transport system 100 includes a second tape reel 108, at least one tape head 110 and guide rollers 112. Tape head 110 may have Anisotropic Magneto-Resistive (AMR), Giant Magneto-Resistive (GMR), or Tunnel Magneto-Resistive (TMR) read elements to read data and manufacturer written servo information from tape 106, and Thin Film (TF) write elements for writing data to tape 106. When the cartridge 102 is inserted into the tape transport system 100, the tape 106 is automatically threaded around the rollers 112, across the tape head 110 and onto the second tape reel 108.

Motors (not shown) operatively coupled to the reels 104 and 108 pull the tape 106 across the tape head 110 which reads/writes information to/from the tape in a known manner. The motors may also move the tape 106 from one reel to another at high speed in fast forward and rewind operations. The motors may be directly coupled to first tape reel, 104 and second tape reel, 108 or there may be a mechanical drive system between the reels and the motor(s). Whether directly coupled or coupled through a mechanical drive system, the type of coupling determines a mechanical relationship between the motor(s) and the tape reels. The mechanical drive system could be for example, gears, belts, pulleys, clutches, etc.

All tape operations may occur with the tape 106 moving in either direction. Thus, either first tape reel 104 or 108 may serve as the supply reel or the take-up reel, depending upon the direction of the tape 106. In FIG. 1, the first tape reel 104 within the cartridge 102 is shown serving as the tape supply reel while the second tape reel 108 is shown serving as the take-up reel. In the following description, the term "supply reel" refers to the reel operating as the supply reel at the present time and the term "take up reel" refers to the reel operating as the take-up reel at the present time. Moreover, the terms "supply motor" and "take-up motor" refer to the motors operatively coupled to the supply and take-up reels, respectively. The type of tape transport system 100 shown in FIG. 1 is for illustrative purposes only and the invention may be employed with other types of transport systems.

Typically, tape 106 moves at a constant linear velocity VTAPE across head 110. Hence, as the radius of the outer wrap of tape R104 and R108, of reels 104 and 108, changes, the angular velocity W104 and W108 of reels 104 and 108 also change, per equation (1). Also, as VTAPE increases, such as during a high speed search, W104 and W108 increase per the following relationship:

$$W104 * R104 = W108 * R108 = VTAPE \quad (1)$$

Per equation (1) above, as the radius of one reel shrinks to its minimum, which is at beginning-of-tape (BOT) for reel 108 and end-of-tape (EOT) for reel 104, that is where the respective motor is spinning at its maximum angular velocity and generates the maximum BEMF. This maximum BEMF is further increased as VTAPE is increased from the normal data I/O velocity to the high-speed search velocity. BEMF is the angular velocity W of a reel motor multiplied by the voltage constant Kvoltage of the motor, which is equal to the torque constant Ktorque of the motor when SI (metric) units are employed. It is the enclosed invention which reduces these two constants by using selective switching to bypass motor coils, in order to reduce the BEMF:

$$BEMF = K\text{voltage} * W \quad (2)$$

The rotational acceleration capability of the motor is reduced per equation (3) when selectively bypassing motor coils because the torque constant Ktorque of the motor is reduced at the same time that the voltage constant Kvoltage is reduced. Reduction of the torque constant Ktorque reduces the torque provided by the motor, and that torque divided by the rotational inertia of the motor and tape reel gives the rotational acceleration of the motor and tape reel, equation (4). However, these bypassed coils may be selectively re-engaged when that higher acceleration (or deacceleration) is desired, preferably when the angular velocity of the motor is in the range which permits an increase in back EMF (BEMF).

$$\text{Torque} = K\text{torque} * \text{Motor\_Current} \quad (3).$$

$$\text{Rotational Acceleration} = \text{Torque}/(\text{Rotational Inertia of Motor} + \text{Reel}) \quad (4).$$

Figure 2:
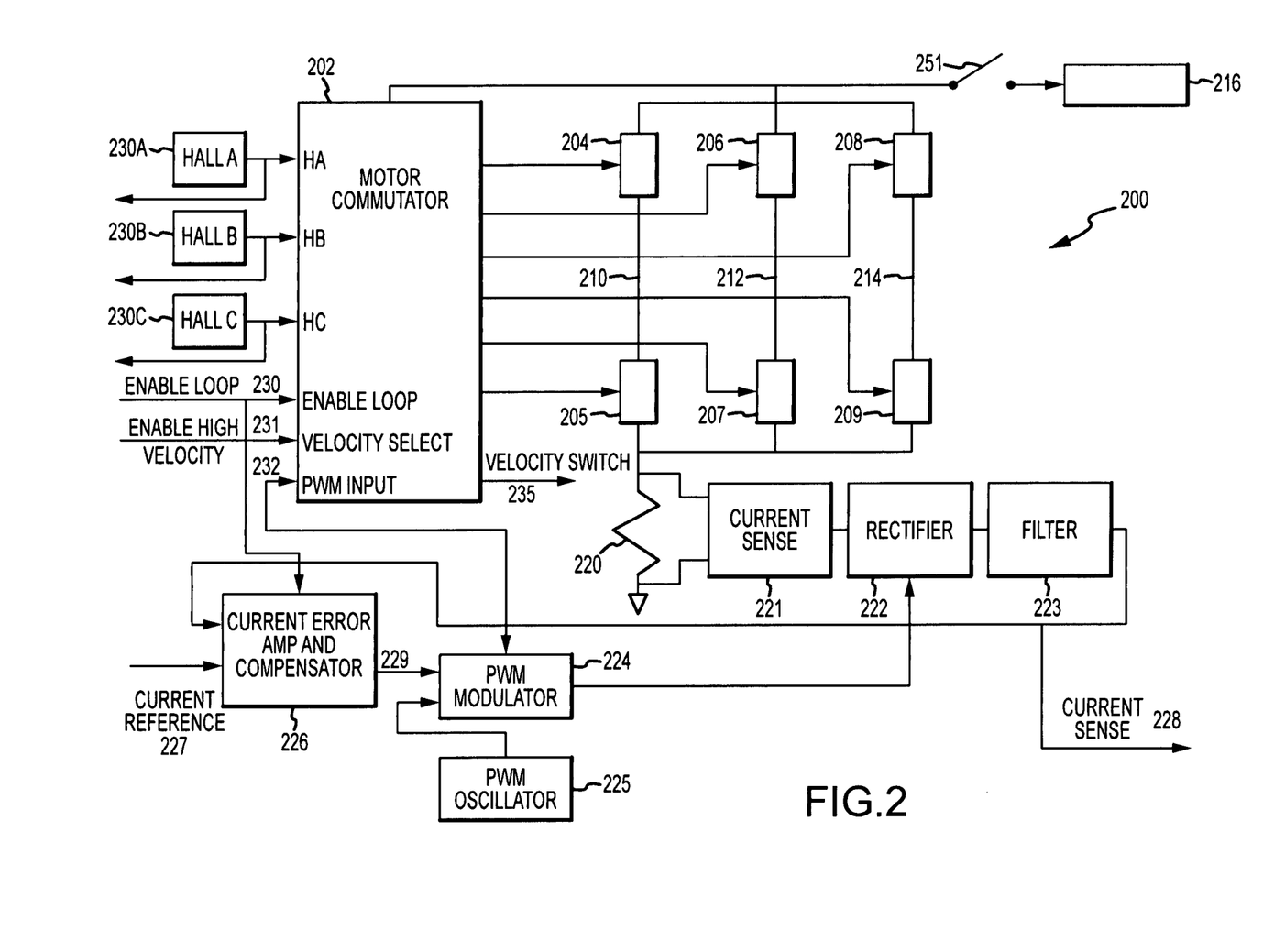
FIG. 2 is a block diagram of a motor control or driver circuit.

FIG. 2 is a block diagram of a motor control or driver circuit 200 for brushless DC motors coupled to the reels 104 and 108 for operation of the disclosed invention. A commutator 202 provides gate control for a set of power switches, such as FET switches 204, 205, 206, 207, 208 and 209, which, in turn, connect/disconnect the motor windings 210, 212 and 214 to/from a motor power supply 216 using switch 251. Sense resistor 220, current sense 221, rectifier 222 and filter 223 provide current sense signal 228 to current error amp and compensator 226.

Figure 4:
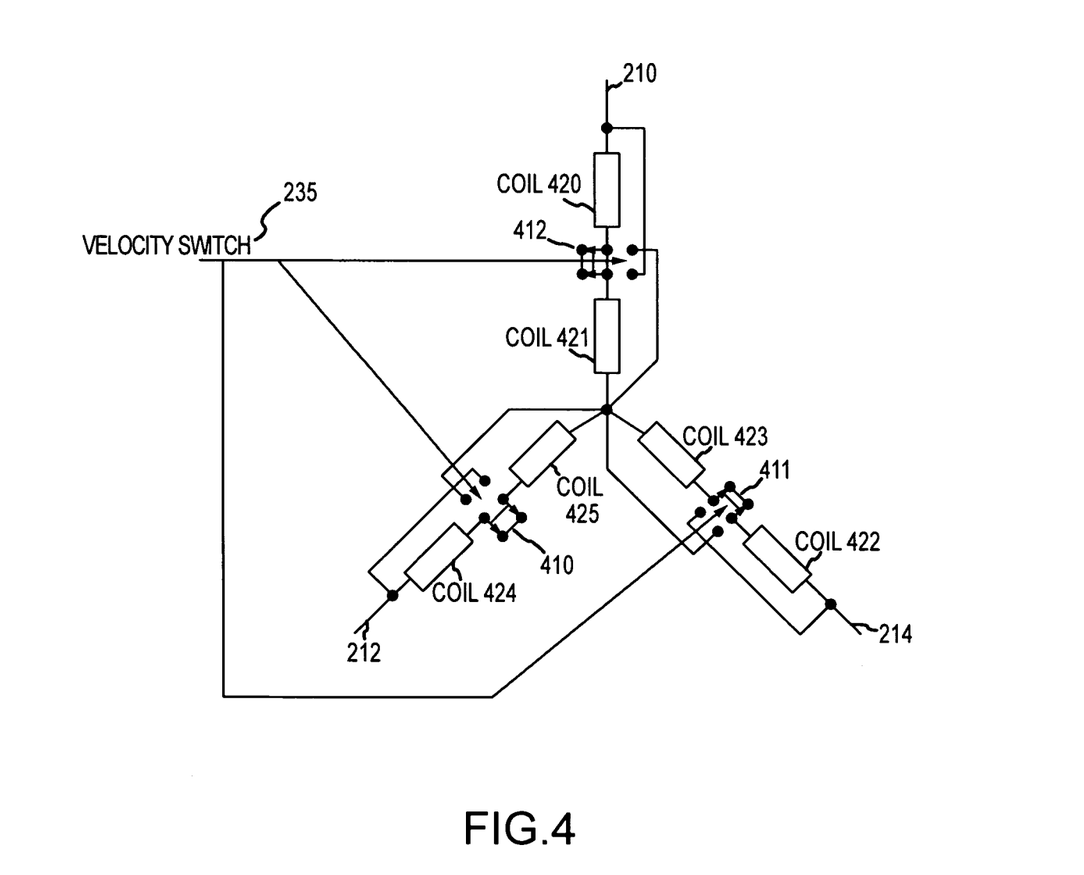
FIG. 4 is a first embodiment of motor coils with velocity switches.
Figure 5:
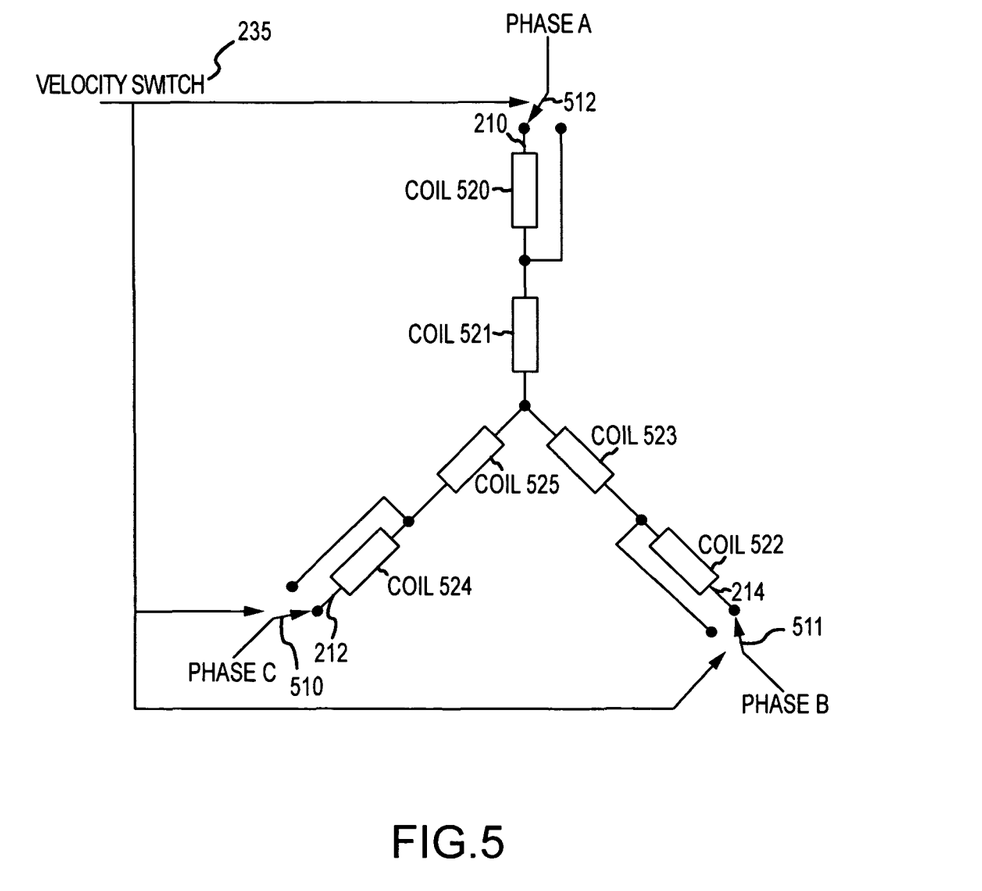
FIG. 5 is a second embodiment of motor coils with velocity switches.

Current error amp and compensator 226 compares current sense signal 228 to current reference 227 and provides an error signal 229 to Pulse Width Modulation (PWM) modulator 224. Current error amp and compensator 226 also provides servo loop compensation to ensure a stable feedback loop for PWM modulator 224. Commutator 202 accepts hall sensor inputs HA, HB, HC from hall sensors 203A, 203B, and 203C, respectively. Commutator 202 also accepts enable loop 230, Enable high velocity 231 which provides Velocity select input, PWM input 232 to control the reel motors 306 and 308 (FIG. 3) using FET switches 204, 205, 206, 207, 208 and 209. Velocity switch output 235 controls velocity switches 410, 411, and 412 (FIGS. 4, 5). PWM oscillator 225 also provides input to PWM 224.

Figure 3:
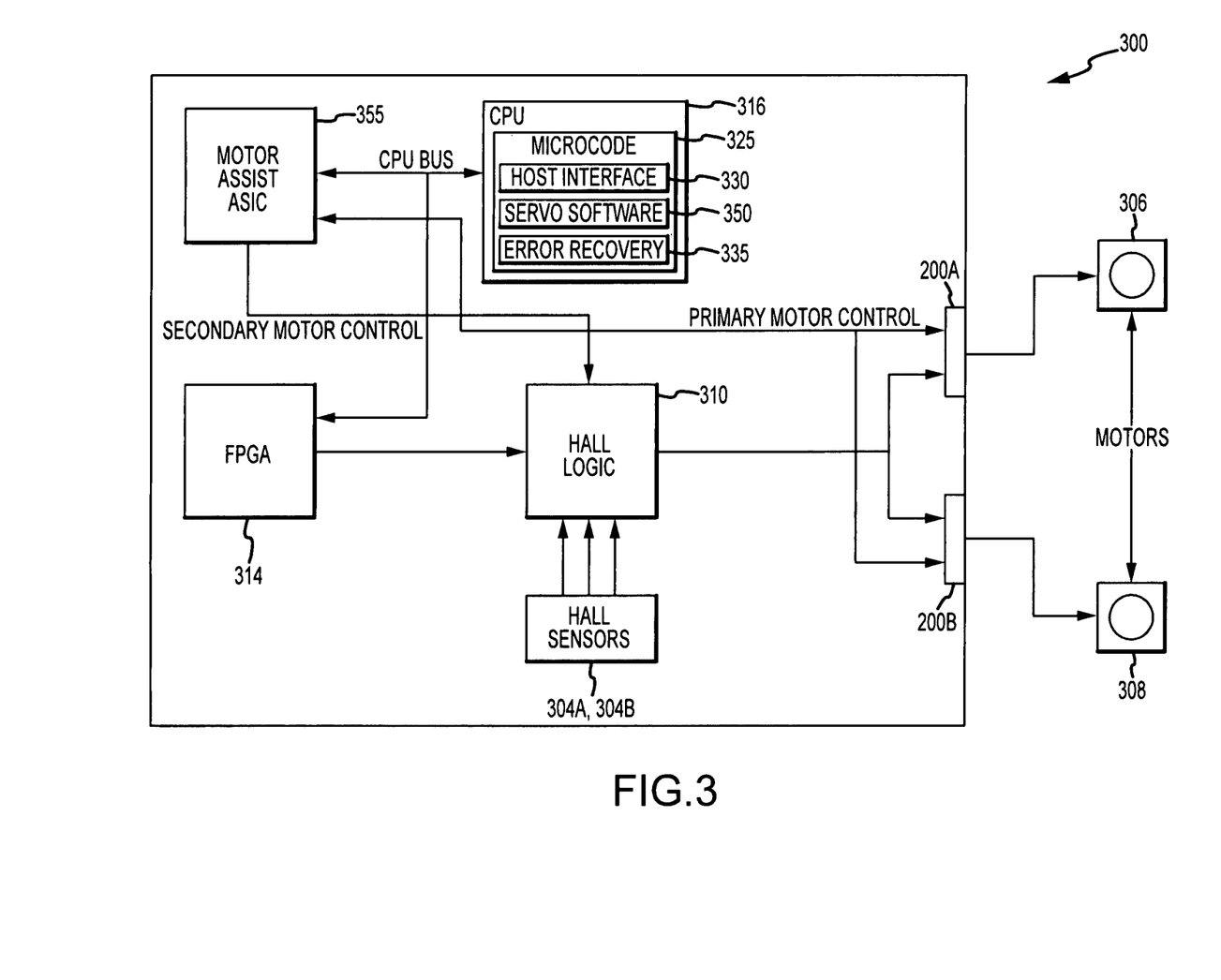
FIG. 3 is a portion of control circuit.

FIG. 3 is an exemplary block diagram of a portion of the tape system 300 in which the velocity switch system of the present invention may be incorporated. Motor driver circuits 200A and 200B are coupled to the two reel motors 306 and 308, respectively. Reel motors 306 and 308, drive first tape reel 104 and second tape reel 108 respectively (FIG. 1). Hall sensors 304A and 304B are coupled to the two reel motors 306 and 308, respectively.

The output from hall sensors 304A and 304B are coupled to hall sensor detection logic 310. During normal servo operation hall sensor detection logic 310 decodes the output signals from hall sensors 304A and 304B to provide motor rotation information for servo software 350. Hall sensor detection logic 310 may be implemented for example by software, firmware, hardware circuits (such as a field programmable gate array (FPGA) 314 as shown), a CPU, ASIC, etc., or a combination thereof. Servo software 350 processes the output from hall sensor detection logic 310 using control system laws to produce primary motor control signals that are transferred through motor assist ASIC (Application Specific Integrated Circuit) 355 and delivered to motor driver circuits 200A and 200B. Motor assist ASIC 355 provides current control logic.

A description of the operation of servo control system for the two reel motors 306 and 308 is given in application Ser. No. 10/223,967 entitled "Direction detection and count method for three channel commutation sensor, filed on Aug. 8, 2002, by the assignee of the present invention, of which is hereby incorporated by reference in its entirety.

Servo software 350 operates within the microcode section 325 of CPU 316. Other software components, including, host interface 330 and error recovery 335 also operate within the microcode section 325 of CPU 316. Host interface 330 provides communication between external hosts and CPU 316. Error recovery 335 provides software procedures to enable CPU 316 to direct operations to recover from errors that may occur during operation of the tape drive.

FIG. 4 shows a first embodiment of velocity control switches 410-412 with motor coils 420-425. Switches 410, 411, and 412 are shown in a position to enable serial connection of motor coils 420-425. During acceleration or deceleration, Velocity switch output 235 activates and controls velocity switches 410, 411, and 412 in a position to enable serial connection of motor coils 420-425. This provides the maximum torque from reel motors 306 and 308.

During periods of higher velocity, Velocity switch output 235 controls velocity switches 410, 411, and 412 in a position to enable parallel connection of motor coils 420-425. This provides the minimum BEMF to allow the maximum velocity from reel motors 306 and 308.

FIG. 5 shows a second embodiment of velocity control switches 510-512 with motor coils 520-525. Switches 510, 511, and 512 are shown in a position to enable serial connection of motor coils 520-525. During acceleration or deceleration, velocity switch output 235 controls velocity switches 510, 511, and 512 in a position to enable serial connection of motor coils 520-525. This provides the maximum torque from reel motors 306 and 308.

During periods of higher velocity, velocity switch output 235 controls velocity switches 510, 511, and 512 in a position to enable bypass of motor coils 520, 522, and 524 (coils 520, 522, and 524 are left open). This provides the minimum BEMF to allow the maximum velocity from reel motors 306 and 308.

Figure 6:
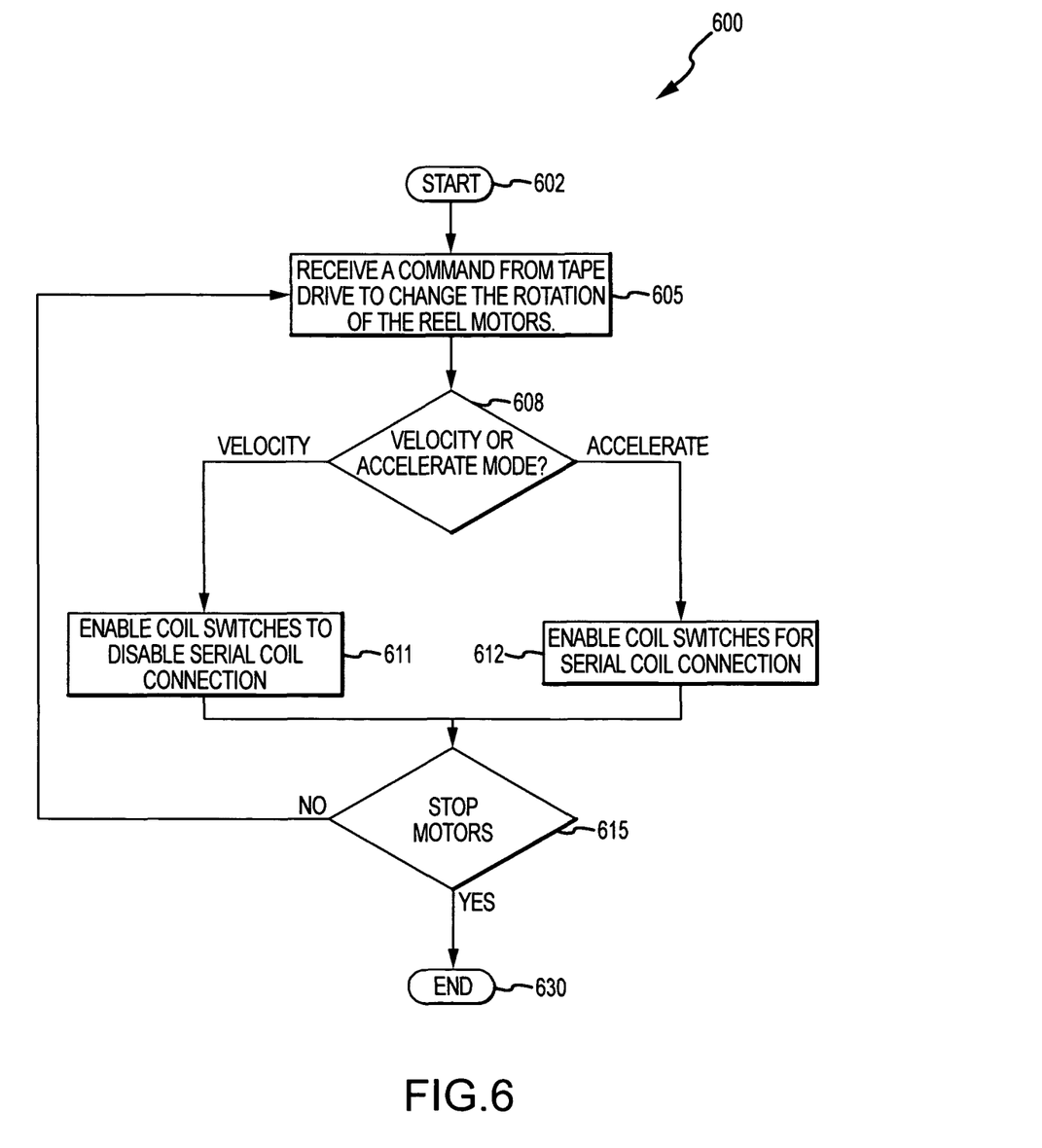
FIG. 6 is an exemplary flowchart for operation.

Turning to FIG. 6, an exemplary method of operation incorporating the mechanisms of the present invention is depicted. As one skilled in the art will appreciate, various steps in the method may be implemented in differing ways to suit a particular application. In addition, the described method may be implemented by various means, such as hardware, software, firmware, or a combination thereof. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

FIG. 6 shows an exemplary flowchart 600 for operation. At step 605, control circuit 200 receives a command from a tape drive to change the rotation of reel motors 306 and 308. If at step 608, the tape drive requires an accelerate mode of operation, then step 612 is executed to enable velocity control switches 510-512 for serial coil connection. If at step 608, the tape drive requires an accelerate mode of operation, then step 611 is executed to disable velocity control switches 510-512 for serial coil connection.

Control flows from step 611 or 612 to step 615. At step 615, reel motors 306 and 308 are stopped, then control flows to step 630 to end, otherwise control flows to step 610, to receive another command from the tape drive.

In certain embodiments, more than two motor coils per phase may be used to provide multiple maximum velocities for a given motor and power supplies. For conceptual purposes, the mechanisms of the present invention may be thought to be analogous to a transmission in a car. For slower speeds and more torque (to provide greater acceleration) multiple motor coils are electronically switched in like low gears of a transmission, such as all coils 520-525 being electrically engaged as shown in FIG. 5. For higher velocities, less coils are used to reduce the BEMF, similar to the higher gears in a transmission, such as selectively bypassing coils 520, 522, and/or 524 as shown in FIG. 5.

The mechanisms of the present invention may be adapted for a variety of tape transport systems including a variety of tape media and tape drives, as one skilled in the art will anticipate. While one or more embodiments of the present invention have been illustrated in detail, the skilled artisan will appreciate that modifications and adaptations to those embodiments may be made without departing from the scope of the present invention as set forth in the following claims. For example, this same invention may be applied to hard disk drives and optical disk drives, as both of which use DC motors to spin a disk and both of which could benefit from faster spinning disks to reduce latency times for data I/O. Additionally, this invention may be applied to both optical tape as well as magnetic tape.

What is claimed is:

1. A system for controlling the rate of movement of tape media in a tape storage drive, the system comprising:
    a power source;
    tape storage drive including at least one tape reel;
    a tape reel motor having power supplied by the power source for driving the at least one tape reel, the tape reel motor having a plurality of motor coils;
    a first phase comprising:
        a first switch coupled to a first velocity switch,
        a first coil coupled to the first switch,
        a second coil, and
        a first node coupled between the first coil and the second coil, the first node further coupled to the first switch;
    a second phase comprising:
        a second switch coupled to a second velocity switch,
        a third coil coupled to the second switch,
        a fourth coil, and
        a second node coupled between the third coil and the fourth coil, the second node further coupled to the second switch;
    a third phase comprising:
        a third switch coupled to a third velocity switch,
        a fifth coil coupled to the third switch,
        a sixth coil, and
        a third node coupled between the fifth coil and the sixth coil, the third node further coupled to the third switch;
    a fourth node coupled to the second coil, the fourth coil, and the sixth coil;
    a fifth node coupled between the third switch and the fifth coil, wherein:
        a current is bi-directional through the first phase, the second phase, and the third phase,
        the first switch, the second switch, and the third switch are configured to selectively place the first phase, the second phase, and the third phase in a first configuration to maximize tape reel motor torque or in a second configuration to reduce a total back electromotive force (BEMF) from each tape reel motor coil; wherein:

in the first configuration, the first switch, the second switch, and the third switch are selectively in a first position to place the first coil, the second coil, the third coil, the fourth coil, the fifth coil, and the sixth coil in a serial configuration to maximize the tape reel motor torque, and in the second configuration, the first switch, the second switch, and the third switch are selectively in a second position to place the first coil, the second coil, the third coil, the fourth coil, the fifth coil, and the sixth coil in a parallel configuration to reduce the total BEMF and increase angular velocity in the first phase, the second phase, and the third phase.

2. The system of claim 1, further comprising a controller coupled to the first switch, the second switch and the third switch, wherein the controller is configured to transmit a request to adjust the angular velocity and an angular acceleration of the at least one tape reel, and the first switch, the second switch, and the third switch are positioned to connect the first phase, the second phase, and the third phase in the parallel configuration to reduce the total BEMF from the first coil, the second coil, the third coil, the fourth coil, the fifth coil, and the sixth coil to and allow for greater angular velocity of the at least one tape reel.

3. The system of claim 1, further comprising a controller coupled to the first switch, the second switch and the third switch, wherein the controller is configured to transmit a request to adjust the angular velocity and an angular acceleration of the least one tape reel and the first switch, the second switch, and the third switch are positioned to bypass an electrical connection to at least one of the first coil, the second coil, the third coil, the fourth coil, the fifth coil, and the sixth coil to provide a minimum back EMF and to maximize angular velocity.

4. The system of claim 1, further comprising a controller coupled to the first switch, the second switch and the third switch, wherein the controller is configured to transmit a request to adjust the angular velocity and an angular acceleration of the least one tape reel to one of increase or decrease the angular acceleration, and the first switch, the second switch, and the third switch are positioned to connect the first coil, the second coil, the third coil, the fourth coil, the fifth coil, and the sixth coil in the serial configuration to maximize torque.

5. The system of claim 1, further comprising a controller coupled to the power source, wherein the first switch, the second switch, and the third switch are selectively activated by the controller to further place the tape storage drive in a third configuration and, in the third configuration, the first switch, the second switch, and the third switch are activated to place the first phase, the second phase, and the third phase in a bypass configuration to reduce a total back electromotive force (BEMF) from the first coil, the second coil, the third coil, the fourth coil, the fifth coil, and the sixth coil and to maximize angular velocity.

6. The system of claim 1, further comprising:
a controller coupled to the first switch, the second switch and the third switch; and
a power inverter connected between the power source and the controller.

7. The system of claim 1, wherein the power source is a battery.

8. A computer program product using a processor device for controlling the rate of movement of tape media in a tape storage drive having a fixed power supply voltage, the tape storage drive including at least one tape reel driven by a tape reel motor having a plurality of motor coils, the computer program product comprising a least one non-transitory computer-readable storage medium comprising instructions that, when executed, cause a system to:

provide a first phase comprising a first switch coupled to a velocity switch, a first coil coupled to the first switch, a second coil, and a first node coupled between the first coil and the second coil, the first node further coupled to the first switch;

provide a second phase comprising a second switch coupled to the velocity switch, a third coil coupled to the second switch, a fourth coil, and a second node coupled between the third coil and the fourth coil, the second node further coupled to the second switch;

provide a third phase comprising a third switch coupled to the velocity switch, a fifth coil coupled to the third switch, a sixth coil, and a third node coupled between the fifth coil and the sixth coil, the third node further coupled to the third switch;

provide a fourth node coupled to the second coil, the fourth coil, and the sixth coil;

provide a fifth node coupled between the third switch and the fifth coil;

provide a bi-directional current through the first phase, the second phase, and the third phase;

configure the first switch, the second switch, and the third switch to selectively place the first phase, the second phase, and the third phase in a first configuration to maximize tape reel motor torque or in a second configuration to reduce a total back electromotive force (BEMF) from each tape reel motor coil; wherein:

in the first configuration, the first switch, the second switch, and the third switch are selectively in a first position to place the first coil, the second coil, the third coil, the fourth coil, the fifth coil, and the sixth coil in a serial configuration to maximize the tape reel motor torque, and in the second configuration, the first switch, the second switch, and the third switch are selectively in a second position to place the first coil, the second coil, the third coil, the fourth coil, the fifth coil, and the sixth coil in a parallel configuration to reduce the total BEMF and increase angular velocity in the first phase, the second phase, and the third phase.

9. The computer-readable storage medium of claim 8, comprising further instructions that, when executed, cause a system to transmit a request to adjust the angular velocity and an angular acceleration of the at least one tape reel, and the first switch, the second switch, and the third switch are positioned to connect the first phase, the second phase, and the third phase in the parallel configuration to reduce the total BEMF from the first coil, the second coil, the third coil, the fourth coil, the fifth coil, and the sixth coil to and allow for greater angular velocity of the at least one tape reel.

10. The computer-readable storage medium of claim 8, comprising further instructions that, when executed, cause a system to transmit a request to adjust the angular velocity and an angular acceleration of the least one tape reel and the first switch, the second switch, and the third switch are positioned to bypass an electrical connection to at least one of the first coil, the second coil, the third coil, the fourth coil, the fifth coil, and the sixth coil to provide a minimum back EMF and to maximize angular velocity.

11. An method, using a processor device, for controlling the rate of movement of tape media in a tape storage drive having a fixed power supply voltage, the tape storage drive including at least one tape reel driven by a tape reel motor having a plurality of motor coils, the method comprising:

provided a first phase comprising a first switch coupled to a velocity switch, a first coil coupled to the first switch, a second coil, and a first node coupled between the first coil and the second coil, the first node further coupled to the first switch;

providing a second phase comprising a second switch coupled to the velocity switch, a third coil coupled to the second switch, a fourth coil, and a second node coupled between the third coil and the fourth coil, the second node further coupled to the second switch;

providing a third phase comprising a third switch coupled to the velocity switch, a fifth coil coupled to the third switch, a sixth coil, and a third node coupled between the fifth coil and the sixth coil, the third node further coupled to the third switch;

providing a fourth node coupled to the second coil, the fourth coil, and the sixth coil;

providing a fifth node coupled between the third switch and the fifth coil;

providing a bi-directional current through the first phase, the second phase, and the third phase; and configuring the first switch, the second switch, and the third switch to selectively place the first phase, the second phase, and the third phase in a first configuration to maximize tape reel motor torque or in a second configuration to reduce a total back electromotive force (BEMF) from each tape reel motor coil; wherein:

in the first configuration, the first switch, the second switch, and the third switch are selectively in a first position to place the first coil, the second coil, the third coil, the fourth coil, the fifth coil, and the sixth coil in a serial configuration to maximize the tape reel motor torque, and in the second configuration, the first switch, the second switch, and the third switch are selectively in a second position to place the first coil, the second coil, the third coil, the fourth coil, the fifth coil, and the sixth coil in a parallel configuration to reduce the total BEMF and increase angular velocity in the first phase, the second phase, and the third phase.

12. The method of claim 11, further comprising transmitting a request to adjust the angular velocity and an angular acceleration of the at least one tape reel, and the first switch, the second switch, and the third switch are positioned to connect the first phase, the second phase, and the third phase in the parallel configuration to reduce the total BEMF from the first coil, the second coil, the third coil, the fourth coil, the fifth coil, and the sixth coil to and allow for greater angular velocity of the at least one tape reel.

13. The method of claim 11, further comprising transmitting a request to adjust the angular velocity and an angular acceleration of the least one tape reel and the first switch, the second switch, and the third switch are positioned to bypass an electrical connection to at least one of the first coil, the second coil, the third coil, the fourth coil, the fifth coil, and the sixth coil to provide a minimum back EMF and to maximize angular velocity.

14. The method of claim 11, further comprising transmitting a request to adjust the angular velocity and an angular acceleration of the least one tape reel to one of increase or decrease the angular acceleration, and the first switch, the second switch, and the third switch are positioned to connect the first coil, the second coil, the third coil, the fourth coil, the fifth coil, and the sixth coil in the serial configuration to maximize torque.

15. The method of claim 11, further comprising selectively activating the first switch, the second switch, and the third switch to further place the tape storage drive in a third configuration and, in the third configuration, the first switch, the second switch, and the third switch are activated to place the first phase, the second phase, and the third phase in a bypass configuration to reduce a total back electromotive force (BEMF) from the first coil, the second coil, the third coil, the fourth coil, the fifth coil, and the sixth coil and to maximize angular velocity.

* * * * *